Dec. 16, 1930.   V. FRESHKOFF   1,785,076

BRAKE BAND LINING DEVICE

Filed Aug. 1, 1929

INVENTOR
Vladimir Freshkoff
BY
Percy Freeman
ATTORNEY

Patented Dec. 16, 1930

1,785,076

UNITED STATES PATENT OFFICE

VLADIMIR FRESHKOFF, OF NEW YORK, N. Y.

BRAKE-BAND-LINING DEVICE

Application filed August 1, 1929. Serial No. 382,752.

This invention relates to devices and method of facilitating the lining of motor vehicle brake bands as applied to motor vehicles and like structures.

In brake re-lining operations it is the present custom to remove the worn lining and replace it with a fresh strip which is cut a little longer than the inside circumference of the brake band and the ends riveted in place, utilizing the old rivet holes, allowing the excess length of lining to bulge until the ends are securely riveted.

Then this bulge or slack is hammered or otherwise forced home thus getting intimate contact between the brake band and the lining. The inner portion of the lining is then riveted and then that section of the lining between the inner rivets is cut away and discarded.

One of the objects of the present invention is to provide a simple and highly effective device whereby the brake band lining may be cut to suitable lengths to suit opposite sides of the band without any loss of material.

A further feature is in the provision of means which materially facilitate replacement of the brake band lining sections by pressing the lining firmly and forcibly outward against the metal band and holding it while being riveted, preventing any possible fullness or looseness from occurring in either side section of the band.

These advantageous objects are attained by the novel construction and combination of few and simple parts as hereinafter described and shown in the accompanying drawing, forming a material component of this disclosure, and in which.

Figure 1:
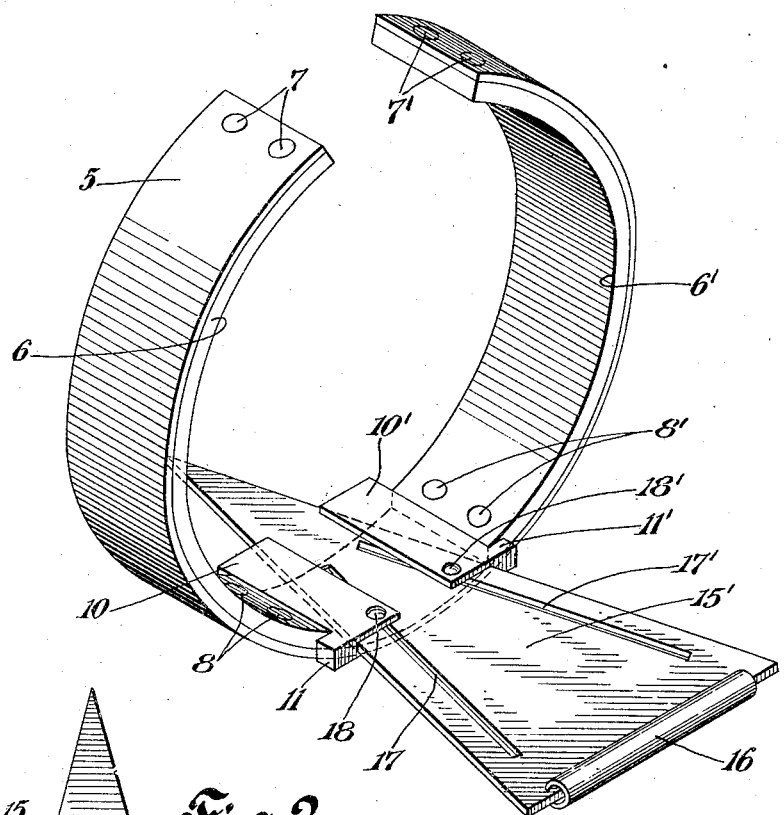
Fig. 1, is a perspective view showing a conventional brake band with its lining and an embodiment of the invention as operatively engaged therewith.

A metal brake band is generally designated by the numeral 5 in the drawing while the brake lining sections are indicated at 6 and 6'.

The sections are cut from a supply roll to a desired length and attached at one of their ends to the meeting ends of the metal band by rivets 7—7' passed through registering openings in the band and lining respectively.

The opposite ends of the lining sections are ultimately held by corresponding rivets 8—8' but before applying them the lining must be pressed forcibly outward to seat firmly on the inner surface of the metal brake band 5.

This is accomplished by inserting between the square cut parallel ends of the sections 6—6' a pair of opposed blocks 10—10' provided at their outer edges with integral lugs 11—11' adapted to engage the edges of the brake lining sections and also the outer edge of the band 5.

Figure 2:
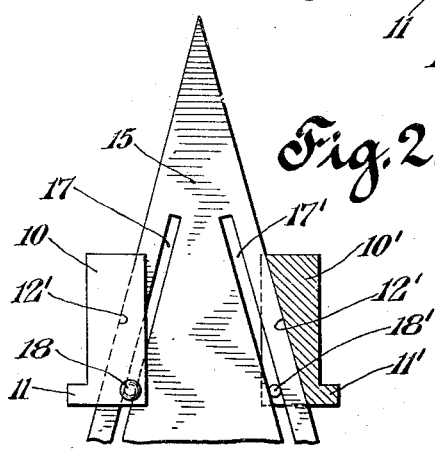
Fig. 2, is a fractional plan view of the device, partially in section.

The blocks have in their inner adjacent sides narrow diagonal slots 12—12' extending from points near the lugs 11—11' to their opposite corners as seen in Fig. 2.

Loosely fitting between the angular bottoms of the slots 12—12' are the opposite edges of a triangular plate 15, its base edge being provided with a rolled handle 16 capable of receiving blows from a hammer in forcing the wedge shaped element 15 between the blocks 10—10' whereby they are spread apart.

Such spreading of the blocks obviously is transferred to the ends of the brake lining sections pressing them forcibly against the inner curved surface of the metal band and holding them under compression while the rivets 8—8' are applied.

In order that the blocks 10—10' may be retracted, slots 17—17' are formed through the metal wedge 15, spaced parallel to its angular edges and passing through the slots are pins 18—18' set in the blocks near their outer ends and having upset heads to retain them in place.

The simplicity of construction and operation will be obvious from the foregoing, but it is not desired to restrict the details to the exact construction shown, it being apparent that minor changes may be made without conflicting with the scope of the invention as denoted by the appended claims.

Having thus described my invention, what I claim as new and desire to secure by Letters Patent, is:

1. A device for compressing a sectional brake lining within a brake band, said lining sections being attached to the band at their outer ends and their inner spaced ends squared, comprising blocks having outer faces to contact the inner ends of said sections, said blocks having diagonal slots in their rear surfaces, lugs on said blocks to contact the edges of said lining and band, and a triangular plate to enter the slots constituting a wedge whereby the blocks may be forced outwardly to compress the lining sections equally.

2. A device for compressing a sectional brake lining within a brake band, said lining sections being attached to the band at their outer ends and their inner spaced ends squared, comprising blocks having outer faces to contact the inner ends of said sections, said blocks having diagonal slots in their rear surfaces, lugs on said blocks to contact the edges of said lining and band, a plate wedge enterable between the slots of said blocks to cause separation thereof, said plate wedge having slots parallel its edges, and pins set in said blocks to pass through the slots in said wedge.

Signed at New York, in the county and State of New York, this 23rd day of July, 1929.

VLADIMIR FRESHKOFF.